US011427115B2

(12) United States Patent
Maust et al.

(10) Patent No.: US 11,427,115 B2
(45) Date of Patent: Aug. 30, 2022

(54) SYSTEM AND METHOD FOR SEAT VIBRATION CANCELLATION

(71) Applicant: STEERING SOLUTIONS IP HOLDING CORPORATION, Saginaw, MI (US)

(72) Inventors: Brian G. Maust, Unionville, MI (US); Benjamin H. Helmreich, Bay City, MI (US); Christopher R. Douglas, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 7 days.

(21) Appl. No.: 17/133,585

(22) Filed: Dec. 23, 2020

(65) Prior Publication Data
US 2021/0129720 A1  May 6, 2021

Related U.S. Application Data

(63) Continuation-in-part of application No. 16/676,086, filed on Nov. 6, 2019.

(51) Int. Cl.
*B60N 2/50* (2006.01)
*F16F 15/02* (2006.01)
(Continued)

(52) U.S. Cl.
CPC ............. *B60N 2/501* (2013.01); *B60N 2/502* (2013.01); *B60N 2/508* (2013.01); *B60N 2/0232* (2013.01);
(Continued)

(58) Field of Classification Search
CPC ........ B60N 5/501; B60N 2/502; B60N 2/505; B60N 5/508; B60N 2/522; B60N 2/24;
(Continued)

(56) References Cited

U.S. PATENT DOCUMENTS 5,169,112 A  * 12/1992 Boyles ................... B60N 2/507
248/421
5,374,025 A  * 12/1994 Whelpley ............. F16F 15/027
267/136
(Continued)

FOREIGN PATENT DOCUMENTS

DE      102020129500 A1 *  5/2021  ......... B63B 17/0081
EP          2390133 A1 * 11/2011  ............. B60N 2/501
(Continued)

*Primary Examiner* — Tan Le
(74) *Attorney, Agent, or Firm* — Dickinson Wright PLLC

(57) ABSTRACT

A method for cancelling seat vibration includes receiving, from an accelerometer, a plurality of accelerometer measurements and applying a first filter to the plurality of accelerometer measurements to remove accelerometer measurements of the plurality of accelerometer measurements having a frequency above a first threshold frequency. The method also includes applying a second filter to an output of the first filter to remove accelerometer measurements of the output of the first filter having a frequency above a second threshold frequency and applying a third filter to an output of the second filter to generate an accelerometer measurement output having a center frequency corresponding to a resonant frequency of the vibration of the at least one component of the seat. The method also includes determining an absolute magnitude value of the accelerometer measurement output and selectively controlling a motor based on the absolute magnitude value of the accelerometer measurement output.

20 Claims, 5 Drawing Sheets

(51) Int. Cl.
*F16F 15/22* (2006.01)
*B60N 2/02* (2006.01)
*F16F 15/00* (2006.01)
*B60N 2/24* (2006.01)
*B63B 17/00* (2006.01)

(52) U.S. Cl.
CPC .............. *B60N 2/0248* (2013.01); *B60N 2/24* (2013.01); *B63B 17/0081* (2013.01); *F16F 15/002* (2013.01); *F16F 15/022* (2013.01); *F16F 2228/066* (2013.01)

(58) Field of Classification Search
CPC ... B60N 2/68; B60N 2/90; B60N 2/54; B60N 2/0232; B60N 2/0248; B60N 2205/00; B63B 17/0081; B60G 17/015; B60G 17/06; F16M 11/24; F16F 15/00; F16F 2230/004; F16F 2228/066
See application file for complete search history.

(56) References Cited

U.S. PATENT DOCUMENTS

| | | | | |
|---|---|---|---|---|
| 5,520,375 | A | * | 5/1996 | Leibach .................. F16F 15/02 267/140.14 |
| 6,472,840 | B1 | * | 10/2002 | Takahashi ............... G03F 7/709 318/649 |
| 8,424,832 | B2 | * | 4/2013 | Robbins ................. B60N 2/501 296/65.01 |
| 2011/0290978 | A1 | * | 12/2011 | Keen ...................... B60N 2/508 248/421 |
| 2021/0129719 | A1 | * | 5/2021 | Helmreich ............. B60N 2/501 |
| 2021/0139107 | A1 | * | 5/2021 | Weber ..................... F16F 15/22 |

FOREIGN PATENT DOCUMENTS

| | | | | |
|---|---|---|---|---|
| WO | WO-2019222172 | A1 | * 11/2019 | ............. B60N 2/501 |
| WO | WO-2020232538 | A1 | * 11/2020 | ............... B60N 2/50 |

\* cited by examiner

SYSTEM AND METHOD FOR SEAT VIBRATION CANCELLATION

CROSS-REFERENCES TO RELATED APPLICATIONS

This Continuation-In-Part patent application claims priority to U.S. patent application Ser. No. 16/676,086, filed Nov. 6, 2019, which is incorporated herein by reference in its entirety.

TECHNICAL FIELD

This disclosure relates to seats and in particular to systems and methods for seat vibration cancellation.

BACKGROUND

Vehicles, such as cars, trucks, sport utility vehicles, crossovers, mini-vans, ride-on industrial equipment (e.g., floor scrubbers, floor sweepers, forklifts, commercial lawnmowers, and the like), boats, airplanes, helicopters, trucking, mining, agriculture, forestry, and/or other suitable vehicles typically include a seat for an operator to sit on while operating the vehicle. During operation of such a vehicle, the operator may experience various vibrations while seated, resulting from various forces acting on the seat.

Typically, such a vehicle includes various strain reduction components adapted to reduce strain on the operator, which may allow the operator to operate the vehicle for longer periods, yielding a higher productive output. The various strain reduction components of the vehicle may include air bladders, mechanical shocks, and the like. The various strain reduction components of the vehicle may be adapted to isolate the operator from the various vibrations experienced while operating the vehicle.

SUMMARY

This disclosure relates generally to seat vibration cancellation.

An aspect of the disclosed embodiments includes a system for cancelling seat vibration. The system includes a motor in mechanical communication with a control arm. The system also includes a processor and a memory. The memory includes instructions that, when executed by the processor, cause the processor to: receive, from an accelerometer, a plurality of accelerometer measurements associated with acceleration corresponding to vibration of at least a component of a seat; apply a first filter to the plurality of accelerometer measurements to remove accelerometer measurements of the plurality of accelerometer measurements having a frequency above a first threshold frequency; apply a second filter to an output of the first filter to remove accelerometer measurements of the output of the first filter having a frequency above a second threshold frequency; apply a third filter to an output of the second filter to generate an accelerometer measurement output having a center frequency corresponding to a resonant frequency of the vibration of the at least one component of the seat; determine an absolute magnitude value of the accelerometer measurement output; and selectively control the motor based on the absolute magnitude value of the accelerometer measurement output.

Another aspect of the disclosed embodiments includes a method for cancelling seat vibration. The method includes receiving, from an accelerometer, a plurality of accelerometer measurements associated with acceleration corresponding to vibration of at least a component of a seat and applying a first filter to the plurality of accelerometer measurements to remove accelerometer measurements of the plurality of accelerometer measurements having a frequency above a first threshold frequency. The method also includes applying a second filter to an output of the first filter to remove accelerometer measurements of the output of the first filter having a frequency above a second threshold frequency and applying a third filter to an output of the second filter to generate an accelerometer measurement output having a center frequency corresponding to a resonant frequency of the vibration of the at least one component of the seat. The method also includes determining an absolute magnitude value of the accelerometer measurement output and selectively controlling a motor based on the absolute magnitude value of the accelerometer measurement output.

Another aspect of the disclosed embodiments includes a vehicle seat apparatus. The apparatus includes a brushless servo motor in mechanical communication with control arm, the control arm extends from a seat top plate to a base mount plate. The apparatus also includes a controller configured to: receive, from an accelerometer, a plurality of accelerometer measurements associated with acceleration corresponding to vibration of at least a component of a seat, the accelerometer being disposed on the base mount plate of the seat; apply a first filter to the plurality of accelerometer measurements to remove accelerometer measurements of the plurality of accelerometer measurements having a frequency above a first threshold frequency; apply a second filter to an output of the first filter to remove accelerometer measurements of the output of the first filter having a frequency above a second threshold frequency; apply a third filter to an output of the second filter to generate an accelerometer measurement output having a center frequency corresponding to a resonant frequency of the vibration of the at least one component of the seat; determine an absolute magnitude value of the accelerometer measurement output; determine a scaled value corresponding to the absolute magnitude value of the accelerometer measurement output and a predetermined range; identify a velocity damping value corresponding to the accelerometer measurement output; apply the scaled value to the velocity damping value; and selectively control the motor based on the absolute magnitude value of the accelerometer measurement output and the velocity damping value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
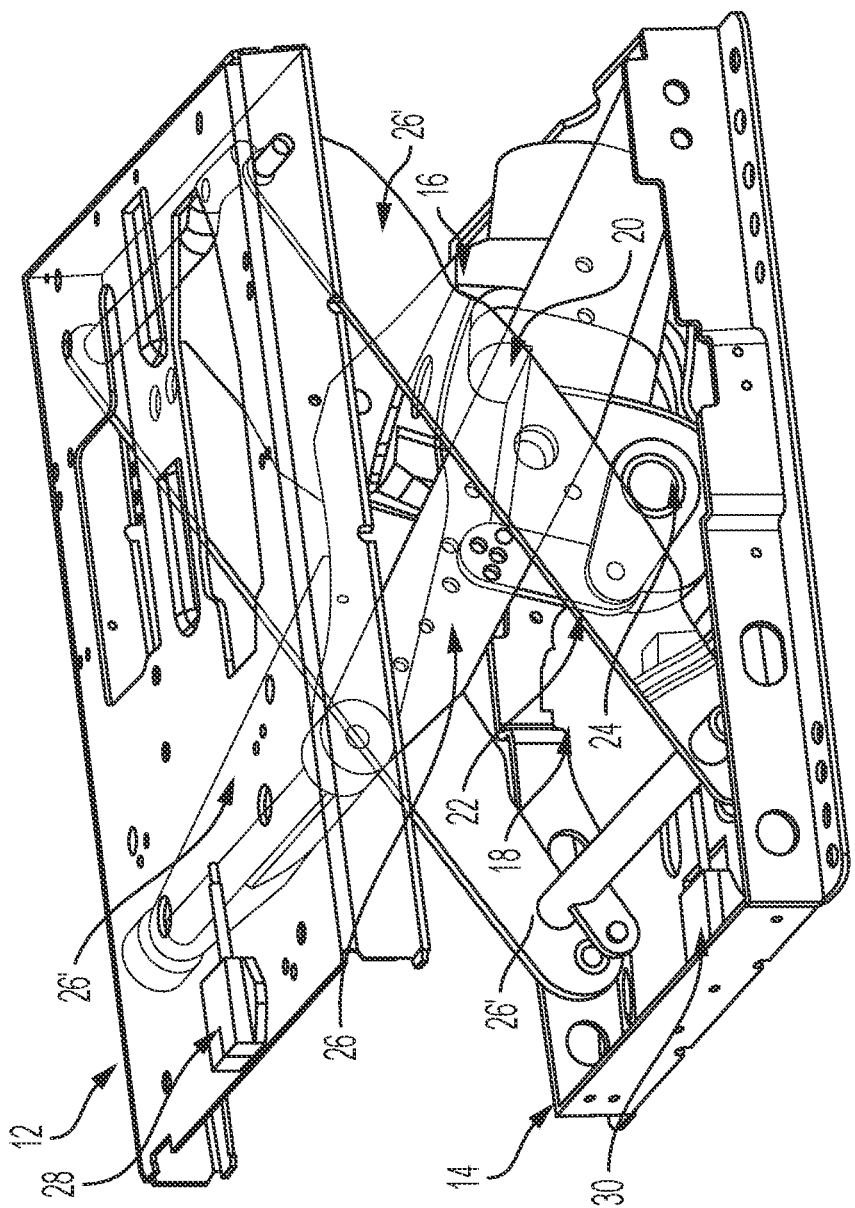
FIG. 1 generally illustrates a vibration cancellation system according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, ride-on industrial equipment (e.g., floor scrubbers, floor sweepers, forklifts, commercial lawnmowers, and the like), boats, airplanes, helicopters, trucking, mining, agriculture, forestry, and/or other suitable vehicles typically include a seat for an operator to sit on while operating the vehicle. During operation of a vehicle, the operator may experience various vibrations while seated, resulting from various forces acting on the seat. For example, engine vibration and various forces exerted on the vehicle, such as those resulting from various characteristics of a path the vehicle is traversing, may cause various vibrations to act on the seat of the vehicle.

Typically, such a vehicle includes various strain reduction components adapted to reduce strain on the operator, which may allow the operator to operate the vehicle for longer periods, yielding a higher productive output. The various strain reduction components of vehicle may include air bladders, mechanical shocks, and the like. The various strain reduction components of the vehicle may be adapted to isolate the operator from the various vibrations experienced while operating the vehicle. The strain reduction components may provide operator comfort and may be an effective passive isolation of the vibration for the operator. However, such typical strain reduction components may not provide an active vibration cancellation and may increase manufacturing costs of typical vehicles.

Accordingly, systems and methods, such as those described herein, that are configured to provide both passive and active vibration cancellation, may be desirable. The systems and methods described herein may be configured to sense floor acceleration of a portion of the vehicle floor disposed proximate or beneath a seat. The systems and methods described herein may be configured to determine and provide cancellation forces to a seat top plate of the seat to control movement of the seat, prior to vibrations and other forces acting on the seat.

In some embodiments, the systems and methods described herein may be configured to provide an operator interface. The operator interface may include a selectable switch (e.g., such as a three position selector switch or other suitable selectable switch), a digital interface switch (e.g., such as on a display of the vehicle or other suitable display), or other suitable operator interface. In some embodiments, the systems and methods described herein may be configured to receive, from the operator interface, an operator preference (e.g., based on an operator selection). The operator preference may indicate a preferred operating mode. The operator modes may include a comfort mode, a medium mode, a firm mode, or other suitable mode. The systems and methods described herein may be configured to adjust the cancellation force provided to the seat top plate based on the operator preference (e.g., to provide a ride firmness selected by the operator).

In some embodiments, the systems and methods described herein may be configured to determine a motor position and a motor speed of a motor associated with the seat of the vehicle. The systems and methods described herein may be configured to determine an amount of torque to be applied, via the motor, to the seat top plate of the seat to reduce or eliminate a harsh mechanical stop impact. Torque may be determined based on the motor position and the motor speed. For example, the amount of torque may include a sum of the motor position and the motor speed, such that the amount of torque is delivered via the motor to the seat top plate in order to oppose the impact on the seat.

In some embodiments, the systems and methods described herein may be configured to receive, from a first accelerometer, a first accelerometer measurement. The systems and methods described herein may be configured to receive, from a second accelerometer, a second accelerometer measurement. The systems and methods described herein may be configured to determine a counter torque value based on the first accelerometer measurement and the second accelerometer measurement. The systems and methods described herein may be configured to selectively control the motor using the counter torque value.

In some embodiments of the systems and methods described herein, the motor may include a brushless servo motor or other suitable motor. In some embodiments of the systems and methods described herein, the first accelerometer is disposed on a seat top plate. In some embodiments of the systems and methods described herein, the second accelerometer is disposed on a base mount plate. In some embodiments of the systems and methods described herein, the control arm is adapted to apply a force corresponding to the counter torque value on a seat top plate. In some embodiments, the systems and methods described herein may be configured to selectively adjust the counter torque value based on an operator preference. In some embodiments of the systems and methods described herein, the operator preference corresponds to a desired ride style of an operator. In some embodiments, the systems and methods described herein may be configured to determine a motor position of the motor. In some embodiments, the systems and methods described herein may be configured to determine a motor speed of the motor. In some embodiments, the systems and methods described herein may be configured to selectively adjust the counter torque value based on the motor position and the motor speed.

In some embodiments, the systems and methods described herein may be configured to cancel floor vibration prior to the vibration reaching the vehicle operator. The systems and methods described herein may be configured to compensate for mechanical resonance of the vehicle seat. The systems and methods described herein may be configured to counter act instabilities by operating at resonance frequencies.

In some embodiments, the systems and methods described herein may be configured to receive, from an accelerometer, a plurality of accelerometer measurements associated with acceleration corresponding to vibration of at least a component of a seat. The systems and methods described herein may be configured to apply a first filter to the plurality of accelerometer measurements to remove accelerometer measurements of the plurality of accelerometer measurements having a frequency above a first threshold frequency. In some embodiments, the first filter includes a low pass filter. In some embodiments, the first threshold corresponds to a cutoff frequency of the first filter. The cutoff frequency may correspond to a result of a product of the resonant frequency of the vibration of the at least one component of the seat and a predetermined value. The predetermined value may include 3 or other suitable value.

In some embodiments, the systems and methods described herein may be configured to apply a second filter to an output of the first filter to remove accelerometer measurements of the output of the first filter having a frequency above a second threshold frequency. In some embodiments, the second filter includes a low pass filter. In some embodiments, the second threshold corresponds to a cutoff frequency of the second filter. The cutoff frequency may correspond to a result of a product of the resonant frequency of the vibration of the at least one component of the seat and a predetermined value. The predetermined value may include 2 or other suitable value. In some embodiments, the first filter and the second filter are configured in a cascade arrangement.

The systems and methods described herein may be configured to apply a third filter to an output of the second filter to generate an accelerometer measurement output having a center frequency corresponding to a resonant frequency of the vibration of the at least one component of the seat. In some embodiments, the third filter may include a narrow notch band pass filter. In some embodiments, a filter bandwidth of the third filter is less than a product of the resonant frequency of the vibration of the at least one component of the seat and 0.1.

The systems and methods described herein may be configured to determine an absolute magnitude value of the accelerometer measurement output. In some embodiments, the systems and methods described herein may be configured to determine the absolute magnitude value of the accelerometer measurement output by applying an average filter to the accelerometer measurement output. The systems and methods described herein may be configured to determine a scaled value corresponding to the absolute magnitude value of the accelerometer measurement output and a predetermined range. The predetermined range may include 0.0 to 1.0 or other suitable range.

In some embodiments, the systems and methods described herein may be configured to identify a velocity damping value corresponding to the accelerometer measurement output. The systems and methods described herein may be configured to apply the scaled value to the velocity damping value. The systems and methods described herein may be configured to selectively control the motor based on the absolute magnitude value of the accelerometer measurement output and velocity damping value.

FIG. 1 generally illustrates a vibration cancelation system 10 according to the principles of the present disclosure. The system 10 may be associated with a seat. The seat and/or the system 10 may be disposed with in a vehicle, such as those described herein. The system 10 may include a seat top plate 12 and a base mount plate 14. The seat top plate 12 may be configured to engage a bottom or lower portion of the seat. The base mount plate 14 may be configured to secure the system 10 and the seat to a portion of a floor of the vehicle.

The system 10 may include a motor 16 disposed on the base mount plate 14. It should be understood that the motor 16 may be disposed in any suitable location besides the base mount plate 14. The motor 16 may include any suitable motor. For example, the motor 16 may include a brushless servo motor or other suitable motor. The system 10 includes a controller 18. The controller 18 may be configured to selectively control the motor 16. For example, the controller 18, as will be described, may be configured to determine various torque values. The controller 18 may control the motor 16 using the determined torque values. For example, the controller 18 may instruct the motor 16 to turn at a speed corresponding to a determined torque value. The motor 16 may move in response to the instructions from the controller 18.

The motor 16 may be in mechanical communication with a gear box 20. The gear box 20 may include any suitable gear box, such as a worm gear box or other suitable gear box. As the motor 16 turns in response to the instructions from the controller 18, the gears within the gear box 20 actuate. The gear box 20 may include a plurality of gears having any suitable gear ratio. The gear box 20 may be configured to reduce rotational speed and increase torque provided by the motor 16. As the gears of the gear box 20 are actuated, a link arm 22 connected to the gear box 20 via lever arm 24 moves, which may cause a lift mechanism 26 to actuate.

The lift mechanism 26 may include one or more control arms 26'. In some embodiments, the control arms 26' may be arranged such that the lift mechanism 26 includes a scissor lift mechanism, however, the lift mechanism 26 may include any suitable lift mechanism. As the link arm 22 moves, the control arms 26' of the lift mechanism 26 apply a force on the seat top plate 12. The force applied by the control arms 26' of the lift mechanism 26 on the seat top plate 12 corresponds to the determined torque applied to the motor 16 by the controller 18.

In some embodiments, the system 10 includes an accelerometer 28 disposed on the seat top plate 12 and an accelerometer 30 disposed on the base mount plate 14. While only the accelerometer 28 and the accelerometer 30 are described, the system 10 may include any suitable number of accelerometers, including fewer or additional accelerometers or sensors than those described herein. The accelerometer 28 and the accelerometer 30 may include any suitable accelerometer. The accelerometer 28 and the accelerometer 30 may be configured to measure acceleration forces acting on the seat top plate 12 and the base mount plate 14, respectively.

Figure 2:
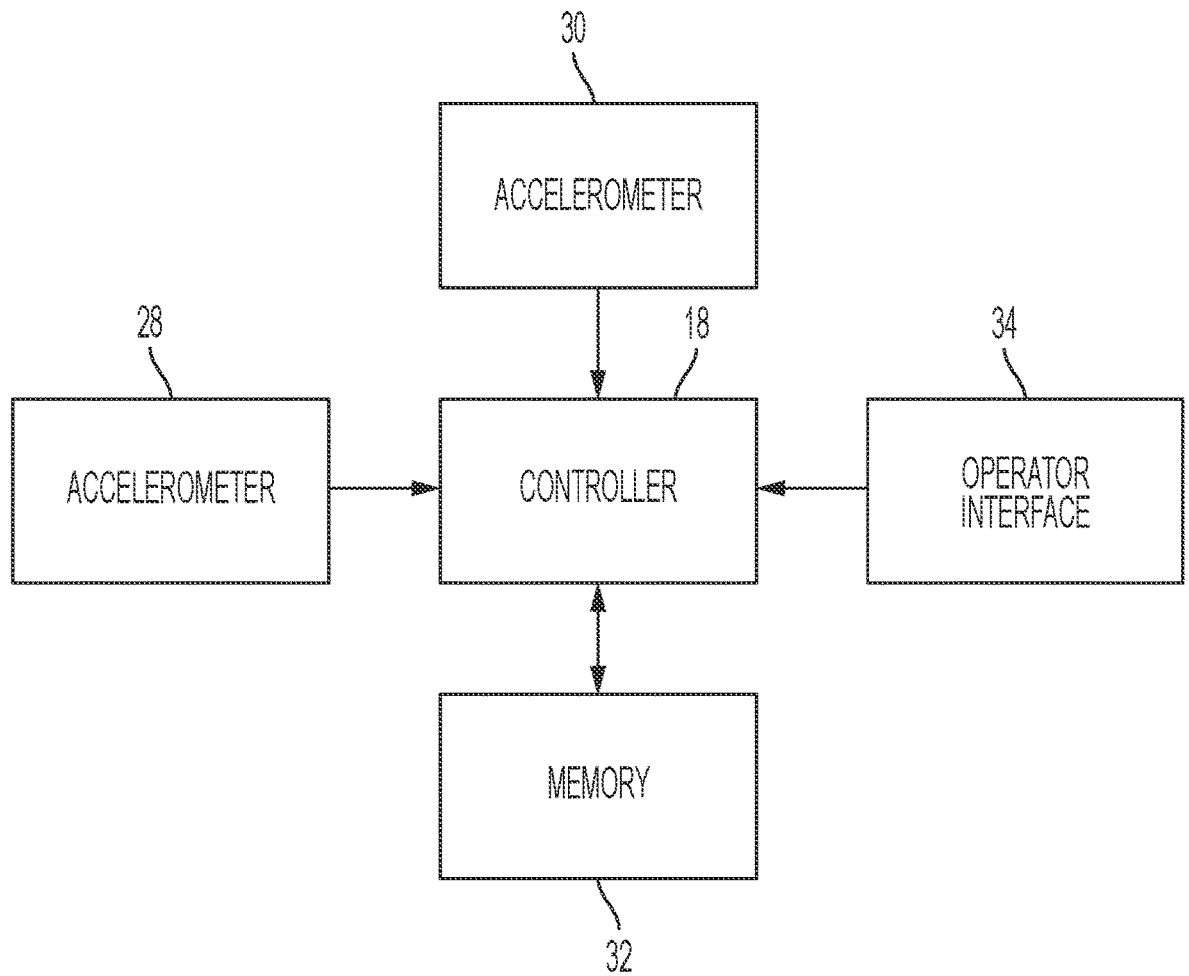
FIG. 2 generally illustrates vibration cancellation controller system according to the principles of the present disclosure.

As described, the system 10 includes the controller 18. The controller 18 may include any suitable controller or processor, such as those described herein. The controller 18 may be configured to executed instructions stored on a memory, such as the memory 32, as is generally illustrated in FIG. 2. The memory 32 may comprise a single disk or a plurality of disks (e.g., hard drives), and includes a storage management module that manages one or more partitions within the memory 32. In some embodiments, memory 32 may include flash memory, semiconductor (solid state) memory or the like. The memory 32 may include Random Access Memory (RAM), a Read-Only Memory (ROM), or a combination thereof.

The instructions stored on the memory 32, when executed by the controller 18, cause the controller 18 to, at least, control or cancel the perception by the operator of vibrations acting on the seat of the vehicle. For example, the controller 18 receives a first accelerometer measurement from the accelerometer 28 and a second accelerometer measurement from the accelerometer 30. The accelerometer measurements represent forces currently acting on the seat top plate 12 and the base mount plate 14, respectively. The controller 18 may be configured to determine a counter torque value based on the first accelerometer measurement and the second accelerometer measurement. The counter torque value corresponds to a torque value that, when the controller 18 controls the motor 16 using the counter torque value, generates a force that is opposite and same or substantially the same in magnitude as the vibrations acting on the seat top plate 12.

As described, the controller 18 controls the motor 16 according to the counter torque value. As the motor 16 turns according to the counter torque value, the gears of the gear box 20 actuate causing the link arm 22 to move. The control arms 26' move or actuate in response to the link arm 22 moving, which causes the lift mechanism 26 to exert a force that is opposite the vibrations acting on the seat top plate 12, which may reduce or cancel the perception by the operator of the vibrations acting on the seat top plate 12.

Figure 5:
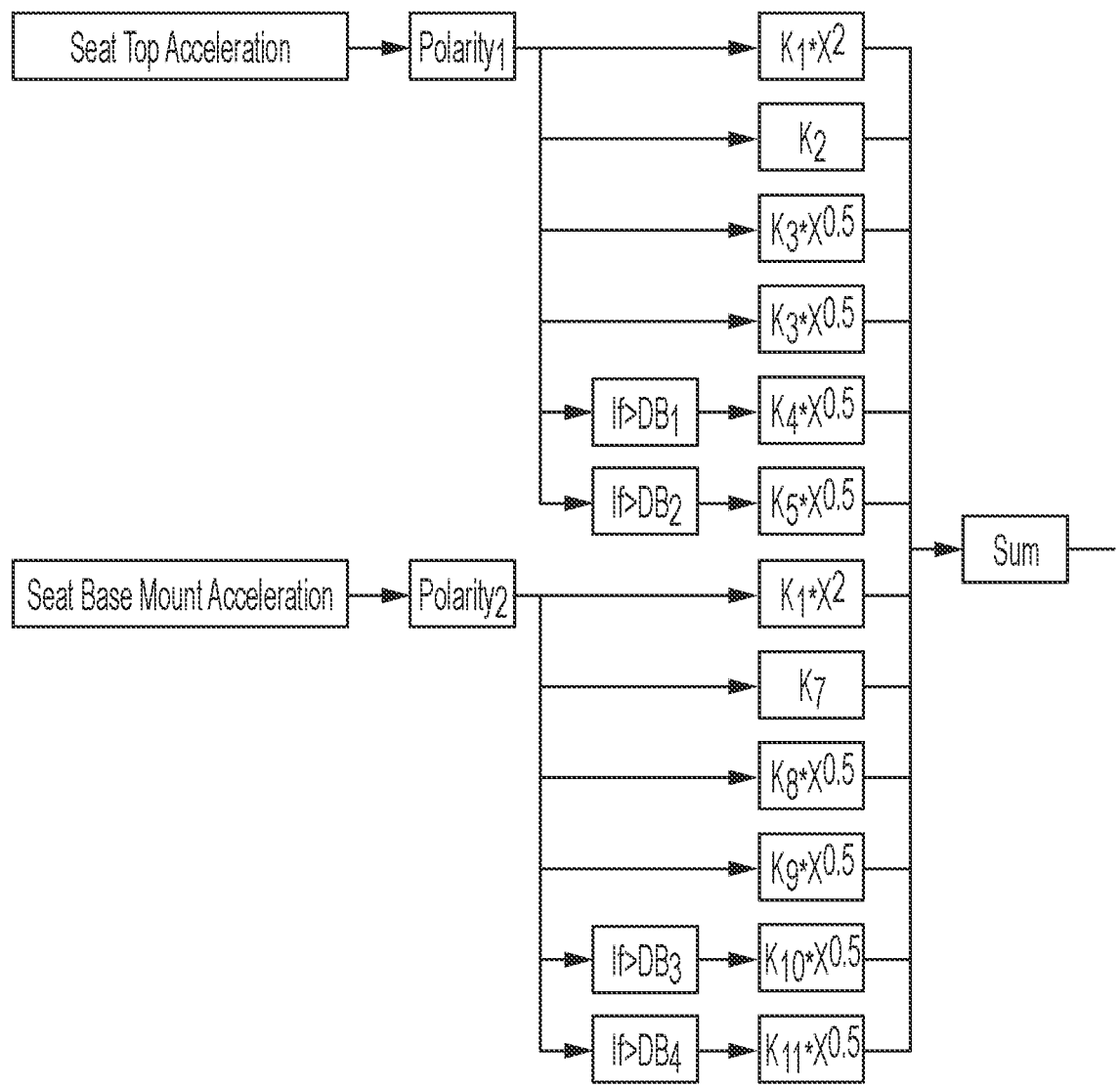
FIG. 5 generally illustrates a counter torque value determination algorithm according to the principles of the present disclosure.

In some embodiments, the controller 18 may determine the counter torque value according to the algorithm as is generally illustrated in FIG. 5.

Where X is an input variable, such as an accelerometer measurement, for each mathematical formula in the algorithm and K is a unique calibratable tuning constant defined for mathematical formula in the algorithm. In the above, each variable may be tunable and/or weighted. The controller 18 may determine the counter torque value based on a sum of the first accelerometer measurement and the second accelerometer measurement.

In some embodiments, the controller 18 may be in communication with an operator interface 34. The operator interface 34 may include any suitable interface. For example, the operator interface 34 may include a selectable switch (e.g., such as a three position selector switch or other suitable selectable switch), a digital interface switch (e.g., such as on a display of the vehicle, on a mobile device display, or other suitable display), or other suitable operator interface. The controller 18 may be configured to receive, an operator preference from the operator interface 34. The operator preference may indicate a preferred operating mode. For example, the operator of the vehicle may select a preferred or desired operating mode using the operator interface 34. The operator modes may include a comfort mode, a medium mode, a firm mode, or other suitable mode. The controller 18 may selectively adjust the counter torque value based on the operator preference. For example, the controller 18 may increase or decrease the counter torque value to provide more or less vibration cancellation based on the operator preference (e.g., to provide a riding experience through vibration cancellation that corresponds to the operator preference.

In some embodiments, the controller 18 may be configured to selectively adjust the counter torque value based on a motor position and a motor speed of the motor 16 in order to control or eliminate a harsh mechanical end stop impact on the seat (e.g., via the seat top plate 12). For example, the controller 18 may determine a motor position of the motor 16. The controller 18 may receive a motor position from a position sensor, or other suitable sensor, disposed proximate the motor 16 and configured to determine a motor position of the motor 16. The controller 18 may determine a motor speed of the motor 16. For example, the controller 18 may receive a motor speed from a velocity sensor, or other suitable sensor, disposed proximate the motor 16 and configured to determine a motor speed of the motor 16.

In some embodiments, the controller 18 converts the motor position into a normalized seat displacement value corresponding to a displacement of the seat range from −100% to +100%. The controller 18 determines a sum of the motor position and the motor speed. The controller 18 determines a torque value and/or selectively adjusts the counter torque value based on the sum of the motor position and the motor speed. The controller 18 controls the motor 16 using the determined torque value or the adjusted counter torque value to reduce or eliminate harsh mechanical end stop impact on the seat top plate 12.

In some embodiments, the controller 18 continues to monitor accelerometer measurements, motor position, and/or motor speed in order to provide continuous reduction or elimination of the perception by the operator of the vibrations acting on the seat via the seat top plate 12.

In some embodiments, the controller 18 may be configured to cancel floor vibration prior to the vibration reaching the vehicle operator. For example, the controller 18 may receive, from the accelerometer 30, a plurality of accelerometer measurements associated with acceleration corresponding to vibration of at least the base mount plate 14 and/or any other suitable component of the seat. It should be understood that, while the accelerometer 30 is described, the controller 18 may receive the plurality of accelerometer measurements form any suitable accelerometer, such as the accelerometer 28 or other suitable accelerometer. In some embodiments, the controller 18 may be configured to remove long-term offsets to components of vibration or acceleration corresponding to the accelerometer measurements.

The controller 18 may be configured to remove high frequency data and to smooth the data corresponding to the accelerometer measurements. For example, the controller 18 may apply a first filter to the plurality of accelerometer measurements to remove accelerometer measurements of the plurality of accelerometer measurements having a frequency above a first threshold frequency. In some embodiments, the first filter includes a low pass filter or other suitable filter. The first threshold corresponds to a cutoff frequency of the first filter. The cutoff frequency may correspond to a result of a product of the resonant frequency of the vibration of at least one the base mount plate 14 and a predetermined value. The predetermined value may include 3 or other suitable value.

In some embodiments, the controller 18 may be configured to provide additional removal of the high frequency data and further smooth the data corresponding to the accelerometer measurements. For example, the controller 18 may apply a second filter to an output of the first filter to remove accelerometer measurements of the output of the first filter having a frequency above a second threshold frequency. The second filter may include a low pass filter or other suitable filter. The second threshold may correspond to a cutoff frequency of the second filter. The cutoff frequency may correspond to a result of a product of the resonant frequency of the vibration of at least the base mount plate 14 and a predetermined value. The predetermined value may include 2 or other suitable value. In some embodiments, the first filter and the second filter are configured in a cascade arrangement, which may allow for increased frequency roll-off, providing an improved frequency isolation.

In some embodiments, the controller 18 may be configured to use the output of the second filter to isolate an input to the motor 16 around a resonant frequency of the vibration of the base mount plate 14. For example the controller 18 may apply a third filter to an output of the second filter to generate an accelerometer measurement output having a center frequency corresponding to the resonant frequency of the vibration of base mount plate 14. The third filter may include a narrow notch band pass filter or other suitable filter. The third filter may include a filter bandwidth that is less than a product of the resonant frequency of the vibration of the base mount plate 14 and a predetermined value. The predetermined value may include 0.1 or other suitable value.

In some embodiments, the controller 18 may be configured to convert the accelerometer measurement output (e.g., which may include a waveform or other suitable output) to an absolute magnitude value, using an accumulator or other suitable mechanism. For example, the controller 18 may determine the absolute magnitude value of the accelerometer measurement output by applying an average filter to the accelerometer measurement output.

In some embodiments, the controller 18 may be configured to perform a gain unity limit function on the absolute magnitude value of the accelerometer measurement output. For example, the controller 18 may determine a scaled value corresponding to the absolute magnitude value of the accelerometer measurement output and a predetermined range. For example, the controller 18 may scale and limit the absolute magnitude value of the accelerometer measurement data to a value within the predetermined range. The predetermined range may include 0.0 to 1.0 or other suitable range.

In some embodiments, the controller 18 may be configured to apply the scaled value to a tunable motor velocity damping output. For example, the controller 18 may identify a velocity damping value corresponding to the accelerometer measurement output. The controller 18 may identify the velocity damping value by retrieving the velocity damping value from a lookup table, a database, or other suitable location or source. The controller 18 may apply the scaled value to the velocity damping value. The controller 18 may selectively control the motor 16 based on the absolute magnitude value of the accelerometer measurement output and velocity damping value.

In some embodiments, the controller 18 may perform the methods described herein. However, the methods described herein as performed by controller 18 are not meant to be limiting, and any type of software executed on a controller can perform the methods described herein without departing from the scope of this disclosure. For example, a controller, such as a processor executing software within a computing device, can perform the methods described herein.

Figure 3:
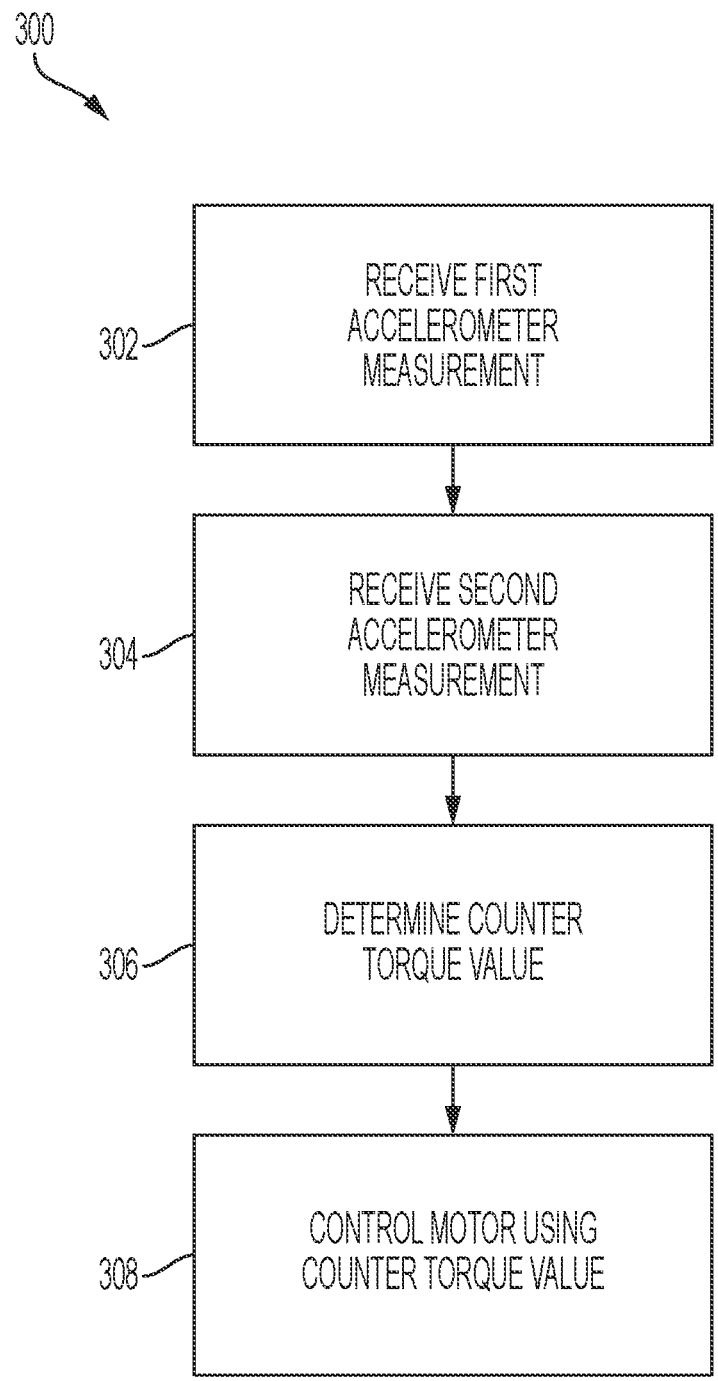
FIG. 3 is a flow diagram generally illustrating a seat vibration cancellation method according to the principles of the present disclosure.

FIG. 3 is a flow diagram generally illustrating a vibration cancellation method 300 according to the principles of the present disclosure. At 302, the method 300, receives a first accelerometer measurement. For example, the controller 18 may receive the first accelerometer measurement from one of the accelerometer 28 and the accelerometer 30.

At 304, the method 300 receives a second accelerometer measurement. For example, the controller 18 may receive the second accelerometer measurement from the other of the accelerometer 28 and the accelerometer 30.

At 306, the method 300 determines a counter torque value. For example, the controller 18 may determine the counter torque value based on the first accelerometer measurement and the second accelerometer measurement. In some embodiments, the controller 18 determines the counter torque value based on the motor position and the motor speed of the motor 16. In some embodiments, the controller 18 may determine a counter torque value based on the first accelerometer measurement and the second accelerometer measurement and may adjust the counter torque value based on the motor position and motor speed. In some embodiments, the controller 18 receives the operator preference, as described. The controller 18 may adjust the counter torque value or any determined torque value based on the operator preference.

At 308, the method 300 controls the motor using the counter torque value. For example, the controller 18 controls the motor 16 using the counter torque value. As the motor 16 turns in response to the counter torque value, the gears of the gear box 20 actuate, which drives the lever arm 24 causing the link arm 22 to move. The movement of the link arm 22 drives the lift mechanism 26, which applies a force, corresponding to the counter torque value, on the seat top plate 12. The force applied on the seat top plate 12 may reduce or eliminate the perception by the operator of the vibrations acting on the seat.

Figure 4:
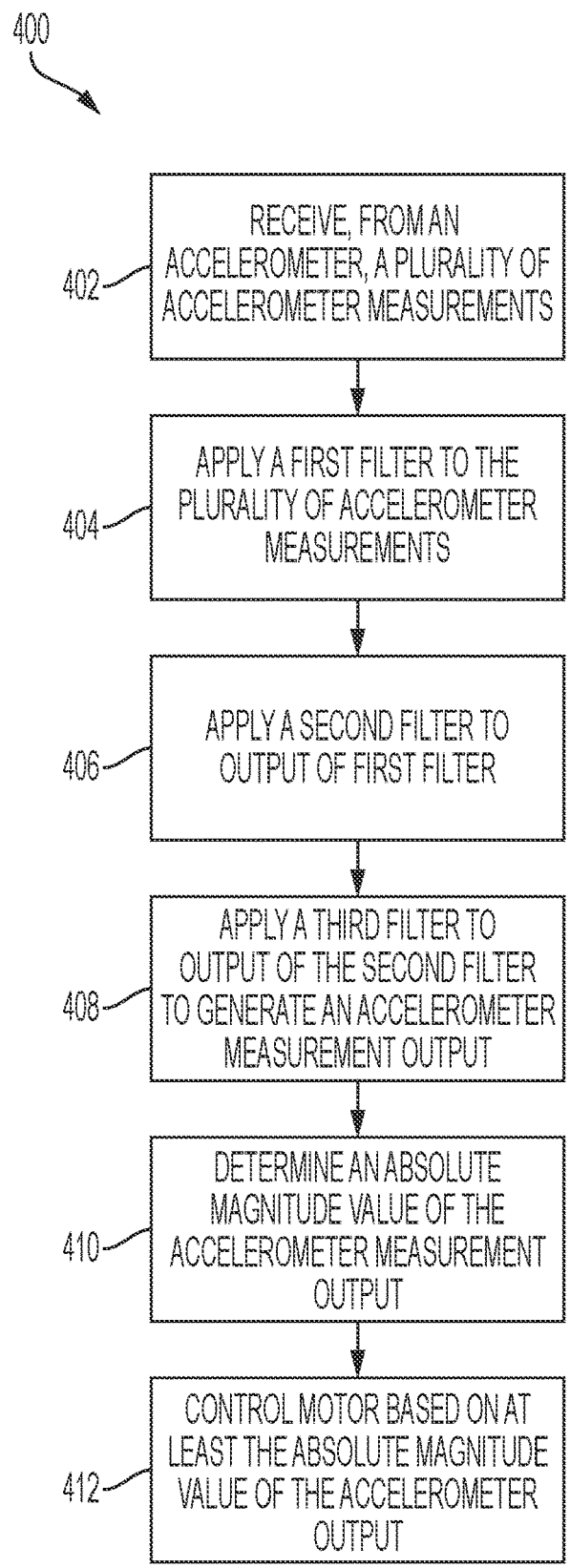
FIG. 4 is a flow diagram generally illustrating an alternative seat vibration cancellation method according to the principles of the present disclosure.

FIG. 4 is a flow diagram generally illustrating an alternative vibration cancellation method 400 according to the principles of the present disclosure. At 402, the method 400 receives, from an accelerometer, a plurality of accelerometer measurements. For example, the controller 18 may receive, from the accelerometer 30 or other suitable accelerometer, the plurality of accelerometer measurements. The plurality of accelerometer measurements may be associated with acceleration corresponding to vibration of the base mount plate 14.

At 404, the method 400 applies a first filter to the plurality of accelerometer measurements. For example, the controller 18 may apply the first filter to the plurality of accelerometer measurements to remove accelerometer measurements of the plurality of accelerometer measurements having a frequency above the first threshold frequency.

At 406, the method 400 may apply a second filter to the output of the first filter. For example, the controller 18 may apply the second filter to the output of the first filter to remove accelerometer measurements of the output of the first filter having a frequency above the second threshold frequency.

At 408, the method 400 may apply a third filter to output of the second filter to generate an accelerometer measurement output. For example, the controller 18 may apply the third filter to the output of the second filter to generate the accelerometer measurement output. The accelerator measurement output may include a center frequency corresponding to a resonant frequency of the vibration of the base mount plate 14.

At 410, the method 400 determines an absolute magnitude value of the accelerometer measurement output. For example, the controller 18 may determine the absolute magnitude value of the accelerometer measurement output. The controller 18 may determine the scaled value corresponding to the absolute magnitude value of the accelerometer measurement output and a predetermined range. The controller 18 may identify the velocity damping value corresponding to the accelerometer measurement output. The controller 18 may apply the scaled value to the velocity damping value.

At 412, the method 400 may control a motor based on at least the absolute magnitude value of the accelerometer measurement output. For example, the controller 18 may selectively control the motor 16 based on the absolute magnitude value of the accelerometer measurement output and the velocity damping value.

In some embodiments, a system for cancelling seat vibration includes a motor in mechanical communication with a control arm. The system also includes a processor and a memory. The memory includes instructions that, when executed by the processor, cause the processor to: receive, from a first accelerometer, a first accelerometer measurement; receive, from a second accelerometer, a second accelerometer measurement; determine a counter torque value based on the first accelerometer measurement and the second accelerometer measurement; and selectively control the motor using the counter torque value.

In some embodiments, the motor includes a brushless servo motor. In some embodiments, the first accelerometer is disposed on a seat top plate. In some embodiments, the second accelerometer is disposed on a base mount plate. In some embodiments, the control arm is adapted to apply a force corresponding to the counter torque value on a seat top plate. In some embodiments, the instructions further cause the processor to selectively adjust the counter torque value based on an operator preference. In some embodiments, the operator preference corresponds to a desired ride style of an operator. In some embodiments, the instructions further cause the processor to determine a motor position and a motor speed of the motor and selectively adjust the counter torque value based on the motor position and the motor speed.

In some embodiments, a method for cancelling seat vibration includes receiving a first accelerometer measurement. The method also includes receiving a second accelerometer measurement. The method also includes determining a counter torque value based on the first accelerometer measurement and the second accelerometer measurement. The method also includes selectively controlling a motor using the counter torque value.

In some embodiments, the motor includes a brushless servo motor. In some embodiments, the first accelerometer measurement corresponds to a seat top plate. In some embodiments, the second accelerometer measurement corresponds a base mount plate. In some embodiments, the method also includes applying a force corresponding to the counter torque value on a seat top plate. In some embodiments, the method also includes selectively adjusting the counter torque value based on an operator preference. In some embodiments, the operator preference corresponds to a desired ride style of an operator. In some embodiments, the method also includes determining a motor position and a motor speed of the motor and selectively adjusting the counter torque value based on the motor position and the motor speed.

In some embodiments, a vehicle seat apparatus includes a brushless servo motor and a controller. The brushless servo motor is in mechanical communication with control arm, the control arm extends from a seat top plate to a base mount plate. The controller is configured to: receive, from a first accelerometer disposed on the seat top plate, a first accelerometer measurement; receive, from a second accelerometer disposed on the base mount plate, a second accelerometer measurement; determine a counter torque value based on the first accelerometer measurement and the second accelerometer measurement; and selectively control the brushless servo motor to apply a force corresponding to the counter torque value to the seat top plate using control arm.

In some embodiments, the controller is further configured to selectively adjust the counter torque value based on an operator preference. In some embodiments, the operator preference corresponds to a desired ride style of an operator. In some embodiments, the controller is further configured to determine a motor position and a motor speed of the brushless servo motor and selectively adjust the counter torque value based on the motor position and the motor speed.

In some embodiments, a system for cancelling seat vibration includes a motor in mechanical communication with a control arm. The system also includes a processor and a memory. The memory includes instructions that, when executed by the processor, cause the processor to: receive, from an accelerometer, a plurality of accelerometer measurements associated with acceleration corresponding to vibration of at least a component of a seat; apply a first filter to the plurality of accelerometer measurements to remove accelerometer measurements of the plurality of accelerometer measurements having a frequency above a first threshold frequency; apply a second filter to an output of the first filter to remove accelerometer measurements of the output of the first filter having a frequency above a second threshold frequency; apply a third filter to an output of the second filter to generate an accelerometer measurement output having a center frequency corresponding to a resonant frequency of the vibration of the at least one component of the seat; determine an absolute magnitude value of the accelerometer measurement output; and selectively control the motor based on the absolute magnitude value of the accelerometer measurement output.

In some embodiments, the first filter includes a low pass filter and wherein the first threshold corresponds to a cutoff frequency of the first filter, the cutoff frequency corresponding to a result of a product of the resonant frequency of the vibration of the at least one component of the seat and a predetermined value. In some embodiments, the predetermined value is 3. In some embodiments, the second filter includes a low pass filter and wherein the second threshold corresponds to a cutoff frequency of the second filter, the cutoff frequency corresponding to a result of a product of the resonant frequency of the vibration of the at least one component of the seat and a predetermined value. In some embodiments, the predetermined value is 2. In some embodiments, the first filter and the second filter are configured in a cascade arrangement. In some embodiments, the third filter includes a narrow notch band pass filter. In some embodiments, a filter bandwidth of the third filter is less than a product of the resonant frequency of the vibration of the at least one component of the seat and 0.1. In some embodiments, the instructions further cause the processor to determine the absolute magnitude value of the accelerometer measurement output by applying an average filter to the accelerometer measurement output. In some embodiments, the instructions further cause the processor to: determine a scaled value corresponding to the absolute magnitude value of the accelerometer measurement output and a predetermined range; identify a velocity damping value corresponding to the accelerometer measurement output; apply the scaled value to the velocity damping value; and selectively control the motor further based on the velocity damping value. In some embodiments, the predetermined range includes 0.0 to 1.0.

In some embodiments, a method for cancelling seat vibration includes receiving, from an accelerometer, a plurality of accelerometer measurements associated with acceleration corresponding to vibration of at least a component of a seat and applying a first filter to the plurality of accelerometer measurements to remove accelerometer measurements of the plurality of accelerometer measurements having a frequency above a first threshold frequency. The method also includes applying a second filter to an output of the first filter to remove accelerometer measurements of the output of the first filter having a frequency above a second threshold frequency and applying a third filter to an output of the second filter to generate an accelerometer measurement output having a center frequency corresponding to a resonant frequency of the vibration of the at least one component of the seat. The method also includes determining an absolute magnitude value of the accelerometer measurement output and selectively controlling a motor based on the absolute magnitude value of the accelerometer measurement output.

In some embodiments, the first filter includes a low pass filter and wherein the first threshold corresponds to a cutoff frequency of the first filter, the cutoff frequency corresponding to a result of a product of the resonant frequency of the vibration of the at least one component of the seat and a predetermined value. In some embodiments, the predetermined value is 3. In some embodiments, the second filter includes a low pass filter and wherein the second threshold corresponds to a cutoff frequency of the second filter, the cutoff frequency corresponding to a result of a product of the resonant frequency of the vibration of the at least one component of the seat and a predetermined value. In some embodiments, the predetermined value is 2. In some embodiments, the first filter and the second filter are configured in a cascade arrangement. In some embodiments, the third filter includes a narrow notch band pass filter. In some embodiments, a filter bandwidth of the third filter is less than a product of the resonant frequency of the vibration of the at least one component of the seat and 0.1.

In some embodiments, a vehicle seat apparatus includes a brushless servo motor in mechanical communication with control arm, the control arm extends from a seat top plate to a base mount plate. The apparatus also includes a controller configured to: receive, from an accelerometer, a plurality of accelerometer measurements associated with acceleration corresponding to vibration of at least a component of a seat, the accelerometer being disposed on the base mount plate of the seat; apply a first filter to the plurality of accelerometer measurements to remove accelerometer measurements of the plurality of accelerometer measurements having a frequency above a first threshold frequency; apply a second filter to an output of the first filter to remove accelerometer measurements of the output of the first filter having a frequency above a second threshold frequency; apply a third filter to an output of the second filter to generate an accelerometer measurement output having a center frequency corresponding to a resonant frequency of the vibration of the at least one component of the seat; determine an absolute magnitude value of the accelerometer measurement output; determine a scaled value corresponding to the absolute magnitude value of the accelerometer measurement output and a predetermined range; identify a velocity damping value corresponding to the accelerometer measurement output; apply the scaled value to the velocity damping value; and selectively control the motor based on the absolute magnitude value of the accelerometer measurement output and the velocity damping value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A system for cancelling seat vibration, the system comprising:
   a motor in mechanical communication with a control arm;
   a processor; and
   a memory that includes instructions that, when executed by the processor, cause the processor to:
      receive, from an accelerometer, a plurality of accelerometer measurements associated with acceleration corresponding to vibration of at least a component of a seat;
      apply a first filter to the plurality of accelerometer measurements to remove accelerometer measurements of the plurality of accelerometer measurements having a frequency above a first threshold frequency;
      apply a second filter to an output of the first filter to remove accelerometer measurements of the output of the first filter having a frequency above a second threshold frequency;
      apply a third filter to an output of the second filter to generate an accelerometer measurement output having a center frequency corresponding to a resonant frequency of the vibration of the at least one component of the seat;
      determine an absolute magnitude value of the accelerometer measurement output; and
      selectively control the motor based on the absolute magnitude value of the accelerometer measurement output.

2. The system of claim 1, wherein the first filter includes a low pass filter and wherein the first threshold corresponds to a cutoff frequency of the first filter, the cutoff frequency corresponding to a result of a product of the resonant frequency of the vibration of the at least one component of the seat and a predetermined value.

3. The system of claim 2, wherein the predetermined value is 3.

4. The system of claim 1, wherein the second filter includes a low pass filter and wherein the second threshold corresponds to a cutoff frequency of the second filter, the cutoff frequency corresponding to a result of a product of the resonant frequency of the vibration of the at least one component of the seat and a predetermined value.

5. The system of claim 4, wherein the predetermined value is 2.

6. The system of claim 1, wherein the first filter and the second filter are configured in a cascade arrangement.

7. The system of claim 1, wherein the third filter includes a narrow notch band pass filter.

8. The system of claim 7, wherein a filter bandwidth of the third filter is less than a product of the resonant frequency of the vibration of the at least one component of the seat and 0.1.

9. The system of claim 1, wherein the instructions further cause the processor to determine the absolute magnitude value of the accelerometer measurement output by applying an average filter to the accelerometer measurement output.

10. The system of claim 1, wherein the instructions further cause the processor to:
   determine a scaled value corresponding to the absolute magnitude value of the accelerometer measurement output and a predetermined range;
   identify a velocity damping value corresponding to the accelerometer measurement output;
   apply the scaled value to the velocity damping value; and
   selectively control the motor further based on the velocity damping value.

11. The system of claim 10, wherein the predetermined range includes 0.0 to 1.0.

12. A method for cancelling seat vibration, the method comprising:
   receiving, from an accelerometer, a plurality of accelerometer measurements associated with acceleration corresponding to vibration of at least a component of a seat;
   applying a first filter to the plurality of accelerometer measurements to remove accelerometer measurements of the plurality of accelerometer measurements having a frequency above a first threshold frequency;
   applying a second filter to an output of the first filter to remove accelerometer measurements of the output of the first filter having a frequency above a second threshold frequency;
   applying a third filter to an output of the second filter to generate an accelerometer measurement output having a center frequency corresponding to a resonant frequency of the vibration of the at least one component of the seat;
   determining an absolute magnitude value of the accelerometer measurement output; and
   selectively controlling a motor based on the absolute magnitude value of the accelerometer measurement output.

13. The method of claim 12, wherein the first filter includes a low pass filter and wherein the first threshold corresponds to a cutoff frequency of the first filter, the cutoff frequency corresponding to a result of a product of the resonant frequency of the vibration of the at least one component of the seat and a predetermined value.

14. The method of claim 13, wherein the predetermined value is 3.

15. The method of claim 12, wherein the second filter includes a low pass filter and wherein the second threshold corresponds to a cutoff frequency of the second filter, the cutoff frequency corresponding to a result of a product of the resonant frequency of the vibration of the at least one component of the seat and a predetermined value.

16. The method of claim 15, wherein the predetermined value is 2.

17. The method of claim 12, wherein the first filter and the second filter are configured in a cascade arrangement.

18. The method of claim 12, wherein the third filter includes a narrow notch band pass filter.

19. The method of claim 18, wherein a filter bandwidth of the third filter is less than a product of the resonant frequency of the vibration of the at least one component of the seat and 0.1.

20. A vehicle seat apparatus comprising:
   a brushless servo motor in mechanical communication with control arm, the control arm extends from a seat top plate to a base mount plate;
   a controller configured to:
      receive, from an accelerometer, a plurality of accelerometer measurements associated with acceleration corresponding to vibration of at least a component of a seat, the accelerometer being disposed on the base mount plate of the seat;
      apply a first filter to the plurality of accelerometer measurements to remove accelerometer measurements of the plurality of accelerometer measurements having a frequency above a first threshold frequency;

apply a second filter to an output of the first filter to remove accelerometer measurements of the output of the first filter having a frequency above a second threshold frequency;

apply a third filter to an output of the second filter to generate an accelerometer measurement output having a center frequency corresponding to a resonant frequency of the vibration of the at least one component of the seat;

determine an absolute magnitude value of the accelerometer measurement output;

determine a scaled value corresponding to the absolute magnitude value of the accelerometer measurement output and a predetermined range;

identify a velocity damping value corresponding to the accelerometer measurement output;

apply the scaled value to the velocity damping value; and selectively control the motor based on the absolute magnitude value of the accelerometer measurement output and the velocity damping value.

* * * * *